United States Patent
Kim et al.

(10) Patent No.: US 8,672,522 B2
(45) Date of Patent: *Mar. 18, 2014

(54) OPTICAL SHEET

(71) Applicant: Kolon Industries, Inc., Gwacheon-si (KR)

(72) Inventors: Tae Kyung Kim, Seoul (KR); Kyoung Jong Kim, Suwon-si (KR)

(73) Assignee: Kolon Industries, Inc., Gwacheon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/646,101

(22) Filed: Oct. 5, 2012

(65) Prior Publication Data

US 2013/0027907 A1 Jan. 31, 2013

Related U.S. Application Data

(63) Continuation of application No. 12/600,974, filed as application No. PCT/KR2008/002890 on May 23, 2008, now Pat. No. 8,309,208.

(30) Foreign Application Priority Data

| May 23, 2007 | (KR) | 10-2007-0050069 |
| May 28, 2007 | (KR) | 10-2007-0051692 |
| Oct. 25, 2007 | (KR) | 10-2007-0107623 |
| May 7, 2008 | (KR) | 10-2008-0042254 |

(51) Int. Cl.
*F21S 8/10* (2006.01)

(52) U.S. Cl.
USPC .................................... 362/317; 428/156

(58) Field of Classification Search
USPC ............... 362/317; 428/156, 157, 1.3, 172; 526/245

See application file for complete search history.

(56) References Cited

U.S. PATENT DOCUMENTS 6,846,089 B2 1/2005 Stevenson et al.

FOREIGN PATENT DOCUMENTS

| JP | 2000-344845 A | 12/2000 |
| JP | 2005-313638 A | 11/2005 |
| KR | 10-0544517 A | 1/2006 |
| KR | 10-2006-0014436 A | 2/2006 |
| KR | 10-2006-0017565 A | 2/2006 |

*Primary Examiner* — Vip Patel
(74) *Attorney, Agent, or Firm* — Sughrue Mion, PLLC

(57) ABSTRACT

Disclosed is an optical sheet for use in liquid crystal displays, which is not easily damaged by external impact, thus facilitating handling thereof and decreasing defective rates, resulting in reduced production costs and increased production efficiency. Decreases in the luminance of the optical sheet due to damage can be prevented.

20 Claims, 3 Drawing Sheets

OPTICAL SHEET

CROSS-REFERENCE TO RELATED APPLICATIONS

This application is a continuation of U.S. patent application Ser. No. 12/600,974 filed on Nov. 19, 2009 (now allowed), which is a National Stage Application of PCT/KR2008/002890 filed on May 23, 2008, which claims priority from Korean Patent Application No. 10-2008-0042254 filed on May 7, 2008, Korean Patent Application No. 10-2007-0107623 filed on Oct. 25, 2007, Korean Patent Application No. 10-2007-0051692 filed on May 28, 2007 and Korean Patent Application No. 10-2007-0050069 filed on May 23, 2007 in the Korean Intellectual Property Office, the disclosures of which are incorporated herein in their entireties by reference.

TECHNICAL FIELD

The present invention relates to an optical sheet for use in liquid crystal displays (LCDs).

BACKGROUND ART

As industrial society develops toward an advanced information age, the importance of electronic displays as a medium for displaying and transferring various pieces of information is increasing day by day. Conventionally, a CRT (Cathode Ray Tube), which is bulky, was widely used therefor, but faced considerable limitations in terms of the space required to mount it, thus making it difficult to manufacture CRTs having larger sizes. Accordingly, CRTs are being replaced with various types of flat panel displays, including LCDs, plasma display panels (PDPs), field emission displays (FEDs), and organic electroluminescent displays. Among such flat panel displays, in particular, LCDs, a technologically intensive product realized from a combination of liquid crystal-semiconductor techniques, are advantageous because they are slim and lightweight and consume little power. Therefore, research and development into structures and manufacturing techniques thereof is continuing. Nowadays, LCDs are already applied in fields such as notebook computers, monitors for desktop computers, and portable personal communication devices (including PDAs and mobile phones). Besides, LCDs are being applied to large-sized TVs, such as HD (High-Definition) TVs, as technology to enlarge their size is overcoming its limitations. Thereby, LCDs are receiving attention as novel displays able to substitute for CRTs, which used to be synonymous for displays.

In such an LCD, a backlight unit, which is a light source device, is an important part determining the properties of the LCD, which is an indirect light-emitting type, showing an image by controlling the transmittance of an external light source.

In particular, as a technique for fabricating an LCD panel is developed, the demand for LCDs which are slim and highly luminant is increased. Accordingly, various attempts to increase the luminance of the backlight unit have been made. The LCD suitable for use in monitors, PDAs (Personal Digital Assistants), and notebook computers is evaluated to be superior when it emits bright light rays from a low energy source. Thus, in the case of the LCD, front-surface luminance is considered very important.

Because the LCD has a structure in which light passing through a light diffusion layer is diffused in all directions, the amount of light traveling toward the front surface becomes very insufficient. Hence, great effort is continually made to exhibit higher luminance with lower power consumption. Further, as the area of the display is enlarged, the viewing angle is required to be wider to enable the image to be viewed by more observers.

To this end, the power of the backlight unit is increased. However, power consumption and concomitant power loss attributable to heat are increased in proportion thereto. In the case of portable displays, the capacity of the battery must be increased, and the life span thereof is shortened.

Hence, with the goal of increasing the luminance, a sheet having a structured layer on which a three-dimensional (3D) structured surface is formed is layered on a light diffusion sheet to impart directionality to light. Such a sheet is illustrated in a manner that includes a transparent resin-cured layer, having a structured surface on one surface thereof and a smooth flat surface on the other surface thereof, and a substrate layer formed on the smooth flat surface of the resin-cured layer to be in contact therewith. The structured layer typically has an array of columns having a triangular cross-section, or alternatively, various forms may be provided.

Because the structured surface generally has individual structures having the same form which are linearly arranged, there is a large concern about damage to the peaks of the structured surface. Further, the angles emitted from such structures are the same in the array, and thus, a difference in the emitted light path between the damaged portion and the peak occurs even when the peaks of the structures are slightly destroyed or small scratches are created on the tilted surface thereof, consequently decreasing the luminance thereof and increasing defective rates.

So, in the production of an optical sheet having a 3D structured surface, problems in which the front surface of the produced sheet is not used depending on the position of small defects may arise, undesirably leading to a decrease in productivity and thus to a burden of high cost. Actually, manufacturers who assemble backlight modules suffer in that, when such a sheet is handled, defective rates attributable to damage to the structures by scratches are considerably problematic. In particular, the optical sheet having a 3D structured surface is disadvantageous in that the peaks of the structured surface may be easily destroyed or damaged even by small external scratches.

Furthermore, in the backlight unit consisting of a plurality of sheets and films, which are layered, when a plurality of optical sheets having 3D structured surfaces is provided to increase luminance, damage to 3D structures must be prevented. This is considered very important.

Hence, in order to prevent damage to the structures, conventional cases in which a protective film is provided have been proposed. However, as the LCD panel becomes slimmer, the general trend is to omit such a film or to use a sheet having a composite function, and also, if a process for forming a protective film is added, the production cost is increased and temporal and physical efficiencies are decreased.

In addition to damage to the structures attributable to handling, while portable displays, such as notebook computers and PDAs, are increasingly used, they are frequently transported in a state of being placed in a bag. During the transport thereof, when impact is applied to the display when a user runs or a car stops suddenly, the structure of the optical sheet in the display is damaged even in the presence of the protective film, negatively affecting the image screen.

Therefore, an optical sheet having a structured surface, capable of flexibly accommodating external impact, is urgently required.

Technical Problem

Accordingly, the present invention provides an optical sheet having a structured surface, in which damage to the structured surface of the optical sheet is prevented, thus maintaining the performance of the optical sheet.

In addition, the present invention provides an optical sheet having a structured surface, in which damage to the structured surface of the optical sheet is prevented, thus facilitating the handling thereof.

In addition, the present invention provides an optical sheet having a structured surface, in which damage to the structured surface of the optical sheet is prevented, thus decreasing defective rates, reducing production costs, and increasing production efficiency.

Technical Solution

According to a first embodiment of the present invention, an optical sheet may comprise a structured layer, which is a resin-cured layer having a structured surface, wherein, when the structured surface is loaded up to a maximum pressure of 5 $g_f$ at a loading rate of 2.648 mN/sec using a flat indenter, in which the shape of the surface of the indenter coming into contact with the structured surface is circular and which has a diameter of 50 μm, held at the maximum pressure for 5 sec, and then unloaded, a difference $D_2$ between the height of the sheet after being unloaded and the original height of the sheet before being loaded satisfies Expression 1 below:

$$D_2 < D/105 \quad \text{Expression 1}$$

wherein D is the height of the optical sheet before being loaded.

The optical sheet may further comprise a substrate layer formed to be in contact with the structured layer and having a thickness of 188 μm±2 μm.

In the optical sheet according to the present invention, $D_2$ may be less than D/120.

In the optical sheet according to the present invention, when the structured surface is loaded up to a maximum pressure of 5 $g_f$ at a loading rate of 2.648 mN/sec using a flat indenter and is then held at the maximum pressure for 5 sec, a pressed depth $D_1$ satisfies Expression 2 below:

$$D_1 < D/15. \quad \text{Expression 2}$$

In particular, $D_1$ may be less than D/16.

In the optical sheet according to the present invention, the structured layer may have a refractive index of 1.5 or more.

The resin-cured layer may be formed from a photopolymerizable composition comprising a photocurable acrylate monomer; a photoinitiator; and an additive.

The photocurable acrylate monomer may comprise one or more selected from a group consisting of a fluorene derivative diacrylate monomer, a bisphenol derivative diacrylate monomer, and a diacrylate monomer having a thiol group.

In the optical sheet according to the present invention, the structured layer may be configured in a form of a linear array of polyhedrons having a triangular, polygonal, semicircular or semi-elliptical cross-section, a linear array of columns which have a triangular, polygonal, semicircular or semi-elliptical cross-section and are adjacent to each other, or a curved array of columns having a triangular, polygonal, semicircular or semi-elliptical cross-section.

In the optical sheet according to the present invention, the structured layer may be configured in a form in which columns having a triangular cross-section are linearly arranged, in which the triangular cross-section may be an isosceles triangle having a base of 50 μm and a height of 25 μm.

In the optical sheet according to the present invention, no element having 7 valence electrons may be contained in the structured layer.

In addition, according to a second embodiment of the present invention, an optical sheet may comprise a structured layer, which is a resin-cured layer having a structured surface, wherein, when the structured surface is loaded up to a maximum pressure of 1 $g_f$ or 2 $g_f$ at a loading rate of 0.2031 mN/sec using a flat indenter, held at the maximum pressure for 5 sec, and then unloaded, the optical sheet has an elastic recovery rate, represented by Expression 3, below, of 85% or more:

$$\text{Elastic Recovery Rate} = \frac{D_1 - D_2}{D_1} \times 100 \quad \text{Expression 3}$$

wherein $D_1$ is a pressed depth due to external pressure, and $D_2$ is a difference between a height of the optical sheet before external pressure is applied and a height of the optical sheet returned to an original state after external pressure is removed.

In the optical sheet according to the present invention, the elastic recovery rate represented by Expression 3 may be 90% or more.

In the optical sheet according to the present invention, $D_1$ may satisfy Expression 4 below, preferably Expression 5 below, more preferably Expression 6 below, still more preferably Expression 7 below, and most preferably Expression 8 below:

$$D_1 > \frac{D}{25} \quad \text{Expression 4}$$

$$D_1 > \frac{D}{20} \quad \text{Expression 5}$$

$$D_1 > \frac{D}{19} \quad \text{Expression 6}$$

$$D_1 > \frac{D}{17} \quad \text{Expression 7}$$

$$D_1 > \frac{D}{14} \quad \text{Expression 8}$$

in Expressions 4~8, D indicates the height of the optical sheet before external pressure is applied.

In the optical sheet according to the present invention, the structured layer has a refractive index of 1.5 or more.

In the optical sheet according to the present invention, the structured layer may comprise one or more curable materials selected from among urethane acrylate, a styrene monomer, a butadiene monomer, an isoprene monomer, and silicone acrylate.

In the optical sheet according to the present invention, the structured layer may be configured in a form of a linear array of polyhedrons having a triangular, polygonal, semicircular or semi-elliptical cross-section, a linear array of columns which have a triangular, polygonal, semicircular or semi-elliptical cross-section and are adjacent to each other, or a curved array of columns having a triangular, polygonal, semicircular or semi-elliptical cross-section.

In an exemplary embodiment of the present invention, a backlight unit assembly may comprise the optical sheet according to the embodiments of the present invention, arranged in one or more layers.

Advantageous Effects

According to the present invention, when an optical sheet is loaded up to a certain maximum pressure at a predetermined loading rate, held at the maximum pressure for a predetermined time, and is then unloaded, the height thereof satisfies a predetermined level. Hence, the optical sheet resists surface damage due to scratches, and thus prevents the generation of non-uniform luminance or the decrease in luminance, thereby maintaining the function of the optical sheet.

Further, the optical sheet according to the present invention is not easily damaged even under external impact, such when a user runs or a car stops suddenly in a state in which portable displays, such as notebook computers or PDAs, are placed in a bag.

Furthermore, the optical sheet according to the present invention is not easily damaged due to the layering of films or external impact in the fabrication process thereof, thus decreasing defective rates, resulting in reduced production costs and increased production efficiency.

DESCRIPTION OF EMBODIMENTS

Hereinafter, a detailed description will be given of the present invention.

According to the present invention, an optical sheet imparted with a structured surface for preventing damage thereto, in particular, an optical sheet including a structured layer, which is a resin-cured layer having a structured surface, is provided.

In the present invention, the optical sheet should resist deformation such that the structured surface thereof is not easily damaged even when subjected to external force, or should be elastic such that it is returned close to its original state even after being pressed.

To this end, according to a preferred embodiment of the present invention, an optical sheet satisfying predetermined values according to the following measurement method is provided.

Figure 1:
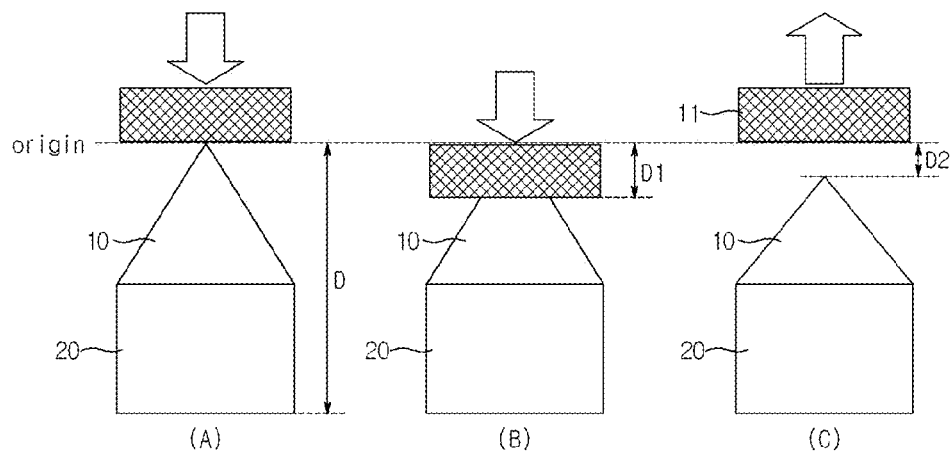
FIG. 1 is a schematic view illustrating a process of testing the elastic recovery rate of an optical sheet.

With reference to FIG. 1, when force is applied to the structured layer 10 of an optical sheet using a flat indenter 11, the upper portion of the structured layer 10 is pressed as shown in (B). The pressed depth is referred to as $D_1$ for convenience. Further, the difference between the height of the sheet after force is removed and the original height of the sheet before the force is applied is referred to as $D_2$.

Specifically, the optical sheet is loaded up to a maximum pressure of 5 $g_f$ at a loading rate of 2.648 mN/sec using a flat indenter, held at the maximum pressure for 5 sec, and then unloaded. Then, the difference $D_2$ between the height of the sheet after being unloaded and the original height of the sheet before being loaded satisfies Expression 1 below.

$$D_2 < D/105 \qquad \text{Expression 1}$$

Preferably, $D_2$ is less than D/120. That is, the optical sheet of the present invention should have high hardness so that it is not destroyed or broken by external impact.

Supposing that $D_2$ is greater than D/105, in the case where the optical sheet is brought into contact with another film or is subjected to a load, the structured surface thereof, in particular, the peaks of structures constituting the structured surface, may be destroyed or broken, without maintaining the shape thereof.

The structured surface of the optical sheet according to the present invention is loaded up to a maximum pressure of 5 $g_f$ at a loading rate of 2.648 mN/sec using a flat indenter and is then held at the maximum pressure for 5 sec. As such, the structured surface of the optical sheet is prevented from being initially destroyed or broken when the pressed depth $D_1$ satisfies Expression 2 below.

$$D_1 < D/15 \qquad \text{Expression 2}$$

Preferably, $D_1$ is less than D/16.

Meanwhile, the shape of the structured layer of the optical sheet according to the present invention is not particularly limited. For example, the structured layer is configured such that polyhedrons having a triangular, polygonal, semicircular or semi-elliptical cross-section are linearly arranged, columns having a triangular, polygonal, semicircular or semi-elliptical cross-section are linearly arranged to be adjacent to each other, or columns having a triangular, polygonal, semicircular or semi-elliptical cross-section are arranged along a curve.

Particularly, the structured layer is configured such that columns having a triangular cross-section are linearly arranged to be adjacent to each other, and more particularly, such that columns having an isosceles triangular cross-section of the base of 50 μm and the height of 25 μm are linearly arranged to be adjacent to each other, from the viewpoint of light-collecting effects.

Further, in the optical sheet including the structured layer which is the resin-cured layer having the structured surface, a substrate layer may be formed to be in contact with the resin-cured layer. The substrate layer is a film made of polyethyleneterephthalate, polycarbonate, polypropylene, polyethylene, polystyrene or polyepoxy resin. Preferably useful is a polyethyleneterephthalate film or a polycarbonate film. The thickness thereof preferably ranges from about 10 μm to about 1,000 μm in terms of mechanical strength, thermal stability, and film flexibility and also of preventing the loss of transmitted light. In particular, in the optical sheet satisfying Expression 1, the thickness of the substrate layer is set to 188±2 μm.

An example of a process of manufacturing the optical sheet for satisfying the above properties includes the formation of a structured layer from a photopolymerizable material which is environmentally friendly and has a high refractive index. Specifically, an optical sheet including a structured layer without an element having 7 valence electrons is illustrative. In the case where the structured layer contains an element having 7 valence electrons, for example, bromine or chlorine, problems in which the structured surface of the resin-cured layer may be easily destroyed or broken under external pressure may be caused. Accordingly, the optical sheet according to the present invention is preferably formed in a manner such that the structured surface is formed with a resin-cured layer containing no element having 7 valence electrons. Further, because a photocurable resin containing a halogen element may generate environmental hormones, no elements having 7 valence electrons are preferred in the structured layer.

In order to realize desired light-collecting efficiency, the structured layer should have a refractive index in an appropriate range. In consideration thereof, the structured layer should have a refractive index of 1.5 or more in the interest of improving the performance of the optical sheet.

When the optical sheet includes such a structured layer, surface damage is prevented and eco-friendly properties and high luminance are realized.

In particular, the structured layer according to the present invention is an acrylate type photocurable resin-cured layer. Further, in order to satisfy the above refractive index, the structured layer is formed from a photopolymerizable composition including, as a photocurable monomer, a fluorene derivative diacrylate monomer, a bisphenol derivative diacrylate monomer, or a diacrylate monomer having a thiol group. Furthermore, in order to realize a high refractive index, the resin-cured layer is formed from a photopolymerizable composition including a fluorene derivative diacrylate monomer as a photocurable monomer.

The photopolymerizable resin composition is composed mainly of an acrylate monomer such as an acrylate type photocurable monomer, a photoinitiator, and an additive, as required.

An example of the acrylate monomer includes a multifunctional acrylate monomer which has a multifunctional group to thus function as a cross-linking agent upon photocuring so that the glass transition temperature is increased to thus enhance hardness after the curing process. Particularly useful is a multifunctional acrylate monomer having an isocyanurate ring, in which the isocyanurate ring has a chemical structure such that delocalization of electron density is uniform. Accordingly, physical adhesion force depending on the gradient of electron density is ensured, thus realizing a function of increasing adhesion force after the curing process. More specific examples of the multifunctional acrylate monomer having an isocyanurate ring include tris(hydroxyalkyl) isocyanurate triacrylate monomers, in particular, tris(2-hydroxyethyl)isocyanurate triacrylate.

Further, examples of the UV curable monomer include tetrahydrofurfuryl acrylate, 2 (2-ethoxyethoxy)ethylacrylate, and 1,6-hexanediol diacrylate. These monomers have the ability to penetrate into fine gaps of the surface of the substrate layer upon curing and are thus responsible for increasing the force of adhesion to the substrate layer.

Also, as a monomer for decreasing the viscosity of the dissolved composition, an acrylate monomer having a viscosity of 2,000 cps or less at 25° C. within the range that does not deteriorate a refractive index is included. Specific examples thereof include benzyl(meth)acrylate, phenoxyethyl(meth)acrylate, phenoxypolyethylene glycol (meth)acrylate, 2-hydroxy-3-phenoxypropylacrylate, neopentyl glycol benzoate acrylate, 2-hydroxy-3-phenoxypropyl acrylate, and phenylphenoxy ethanol acrylate.

Examples of the photoinitiator for initiating the photopolymerization of photocurable monomers include phosphine oxides, propanones, ketones, and formates.

The composition for the resin-cured layer may further include a UV absorbent for preventing the optical sheet from yellowing due to UV light exposure upon use for a long period of time, if necessary, and examples thereof include oxalic anilides, benzophenones, benzotriazines, and benzotriazoles.

Additionally, a UV stabilizer may be included, and examples thereof include hindered amines. Also, an antistatic agent may be included as an additive.

The structured layer is formed through primary photocuring in an amount of UV radiation of 50~300 mJ/m$^2$ and then secondary photocuring in an amount of UV radiation of 300~900 mJ/m$^2$. When the amount of UV radiation is in the above range, the yellowing of the structured layer without an element having 7 valence electrons is prevented, as desired.

In addition, in order to prevent damage to the structured surface even under external force, an optical sheet satisfying predetermined values through the following measurement method according to another preferred embodiment of the present invention is provided.

The structured surface of the structured layer of the optical sheet is loaded up to a maximum pressure of 1 $g_f$ or 2 $g_f$ at a loading rate of 0.2031 mN/sec using a flat indenter, held at the maximum pressure for 5 sec, and then unloaded. At this time, the optical sheet exhibits an elastic recovery rate, represented by Expression 3, below, of 85% or more. Preferably, the elastic recovery rate represented by Expression 3 below is 90% or more.

$$\text{Elastic Recovery Rate} = \frac{D_1 - D_2}{D_1} \times 100 \qquad \text{Expression 3}$$

wherein $D_1$ is the pressed depth due to the application of external pressure, and $D_2$ is the difference between the height of the optical sheet before external pressure is applied and the height of the optical sheet, returned to its original state after the external pressure is removed.

With reference to FIG. 1, when force is applied to the structured layer 10 of the optical sheet using a flat indenter 11, the upper surface of the structured layer 10 is pressed as shown in (B). As such, the pressed depth is referred to as $D_1$ for convenience.

Thereafter, when the flat indenter 11 is removed, the upper surface of the structured layer 10 is returned as close as possible to its original state without damage, as shown in (C). The difference between the height of the optical sheet which is returned to its original state after being unloaded and the original height D of the optical sheet before being loaded is referred to as $D_2$.

Thus, when the difference $D_1$-$D_2$ between the pressed depth due to external pressure and the height difference of the optical sheet before and after pressing is larger, elastic force is determined to be superior. The optical sheet of the present invention exhibits an elastic recovery rate represented by Expression 1 satisfying 85% or more, and preferably 90% or more. The optical sheet according to the present invention has large $D_1$ and large $D_1$-$D_2$ and thus manifests high elastic force, which indicates that it is greatly pressed by external impact and is then returned as close as possible to its original state.

When the optical sheet of the present invention, which is loaded and then unloaded as mentioned above, has an elastic recovery rate represented by Expression 3 of 85% or more, it has elastic force to the extent of flexibly accommodating external impact, thus preventing damage to the structured layer.

However, when the optical sheet of the present invention, which is loaded and then unloaded as above, has an elastic recovery rate represented by Expression 3 of less than 85%, it is maintained in a state in which the upper surface of the structured layer is pressed when in contact with another film or when subjected to a load, undesirably losing the function as an optical sheet.

In the optical sheet of the present invention, $D_1$, which indicates the pressed depth due to external pressure, satisfies Expression 4 below, preferably Expression 5 below, more preferably Expression 6 below, still more preferably Expression 7 below, and most preferably Expression 8 below.

$$D_1 > \frac{D}{25} \qquad \text{Expression 4}$$

$$D_1 > \frac{D}{20} \qquad \text{Expression 5}$$

$$D_1 > \frac{D}{19} \qquad \text{Expression 6}$$

$$D_1 > \frac{D}{17} \qquad \text{Expression 7}$$

$$D_1 > \frac{D}{14} \qquad \text{Expression 8}$$

In Expressions 4~8, D indicates the height of the optical sheet before external pressure is applied.

That is, the optical sheet of the present invention should have flexibility such that the pressed depth due to external pressure is 1/25 or more of the height of the optical sheet before external pressure is applied. If so, in the case where the optical sheet is disposed to be in contact with another film or is subjected to a load, the upper surface of the structured layer is preferably maintained in a normal shape. Specifically, the optical sheet of the present invention has flexibility such that it is greatly pressed and resists damage due to external impact.

Consequently, when the optical sheet of the present invention is subjected to a large load, the structured layer, having 3D structures is easily pressed. After this, when the pressed state is released, the optical sheet is returned as close as possible to its original state, and thus, the structured layer thereof is not damaged even by external impact.

Further, the structured layer having such elastic force preferably has a refractive index of 1.5 or more. This is to increase light-collecting efficiency in consideration of the refractive index of the substrate layer, in order to ultimately ensure desired front-surface luminance.

Various methods may be proposed to provide the optical sheet satisfying the elastic recovery rate and refractive index as above. An example thereof includes the formation of a composition for a structured layer of an optical sheet that is composed of material which mainly exhibits elastomer properties, rather than rubber properties, and the optical properties of which do not deteriorate.

Examples of the material for the structured layer include urethane acrylate, a styrene monomer, a butadiene monomer, an isoprene monomer, and silicone acrylate. However, the structured layer is not limited to containing a curable monomer or oligomer therein, as long as it satisfies the above elastic recovery rate.

The optical sheet of the present invention includes the structured layer having a plurality of 3D structures, as the resin-cured layer having the structured surface. The structured layer is configured such that polyhedrons having a triangular, polygonal, semicircular or semi-elliptical cross-section are linearly arranged, columns having a triangular, polygonal, semicircular or semi-elliptical cross-section are linearly arranged to be adjacent to each other, or columns having a triangular, polygonal, semicircular or semi-elliptical cross-section are arranged along a curve.

Also, the structured layer may be configured in a form in which one or more concentric circles are arranged when viewed from above, with the ridges and valleys formed along the concentric circles.

In the case where the structured layer has a polygonal cross-section, the luminance and viewing angle are remarkably changed depending on the angle of the vertices. In consideration of luminance and viewing angle by light collection, the angle of the vertices is preferably set to 80~100°, and more preferably 85~95°.

The substrate layer of the optical sheet is formed of one or more materials selected from the group consisting of polyethyleneterephthalate, polyethylenenaphthalate, polycarbonate, polystyrene, polymethacrylate, polymethylmethacrylate, polyacrylate, polyimide, and polyamide, and may further include light-diffusing particles to thus form an uneven structure.

The method of manufacturing the optical sheet of the present invention is not particularly limited. For example, the material for the structured layer is added with an additive, such as a UV curing agent, thus preparing a UV curable liquid composition, which is then applied on the substrate layer and then cured, thereby obtaining an optical sheet.

Figure 2:
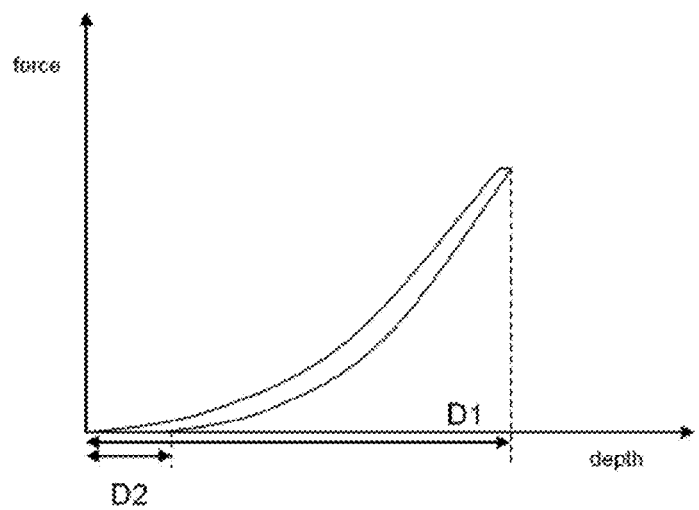
FIG. 2 is a graph illustrating the force applied to a polymer material having a high elastic recovery rate versus the $D_1$ and $D_2$.
Figure 3:
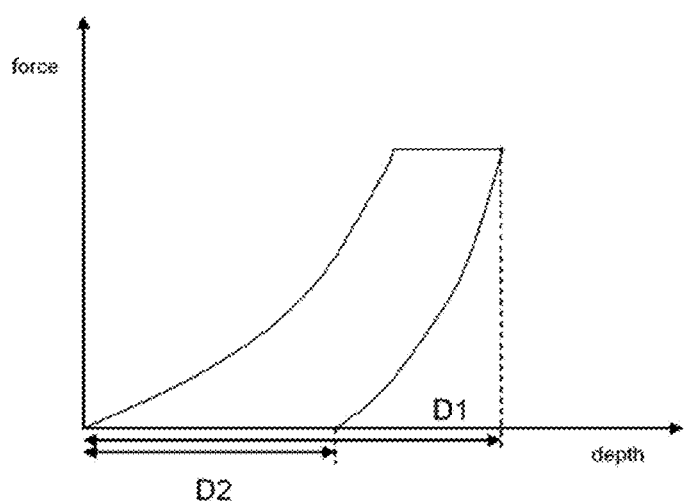
FIG. 3 is a graph illustrating the force applied to a polymer material having a low elastic recovery rate versus the $D_1$ and $D_2$.

FIG. 2 is a graph showing the force applied to a polymer material having a high elastic recovery rate versus the $D_1$ and $D_2$, and FIG. 3 is a graph showing the force applied to a polymer material having a low elastic recovery rate versus the $D_1$ and $D_2$. As the elastic recovery rate of the material is higher, $D_2$ is close to 0. In the case of an ideal elastic material, $D_2$ equals to 0, thus realizing an elastic recovery rate of 100%. Conversely, as the elastic recovery rate decreases, $D_2$ approaches $D_1$, and thus $D_1$-$D_2$ approximates 0.

The optical sheet of the present invention accords to the graph of FIG. 2, and the polymer material of the present invention is not limited to the curve shape of FIG. 2.

Figure 4:
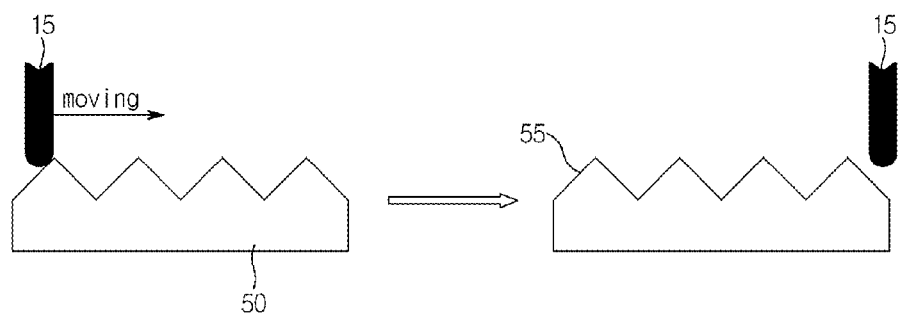
FIG. 4 is a schematic view illustrating a process of scratching the optical sheet of the present invention using a scratching probe.
Figure 5:
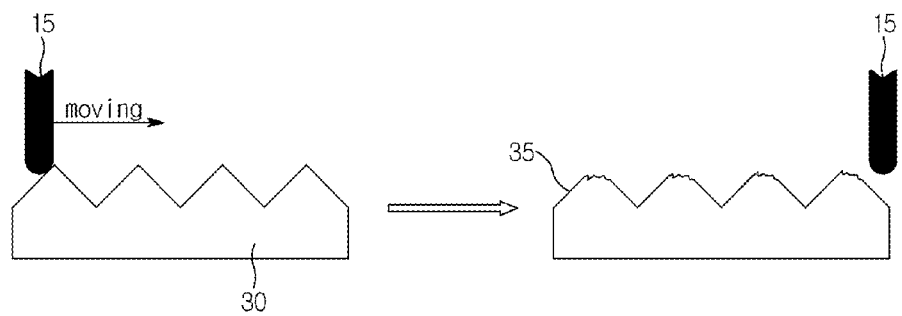
FIG. 5 is a schematic view illustrating a process of scratching a conventional optical sheet using a scratching probe.
Figure 6:
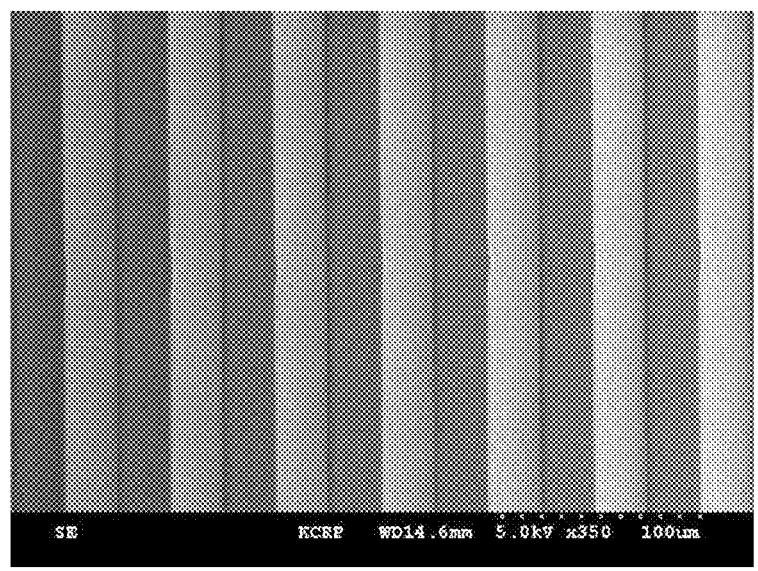
FIG. 6 to 9 are SEM images illustrating the surfaces of the optical sheets of Example 21 and Comparative Examples 1 to 3, respectively, after being scratched as shown in FIGS. 4 and 5.
Figure 7:
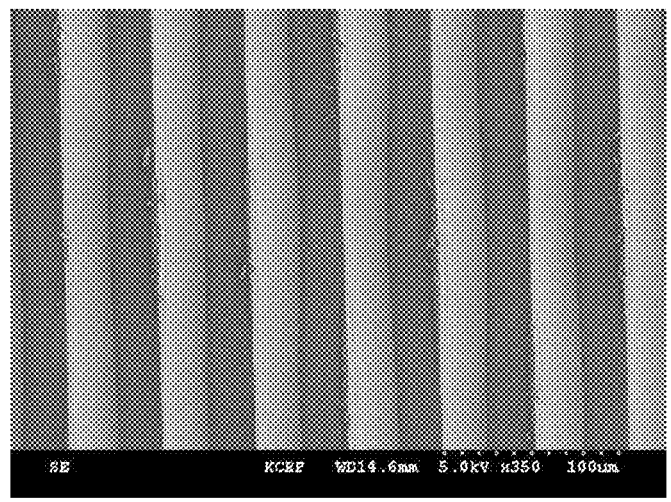
Figure 8:
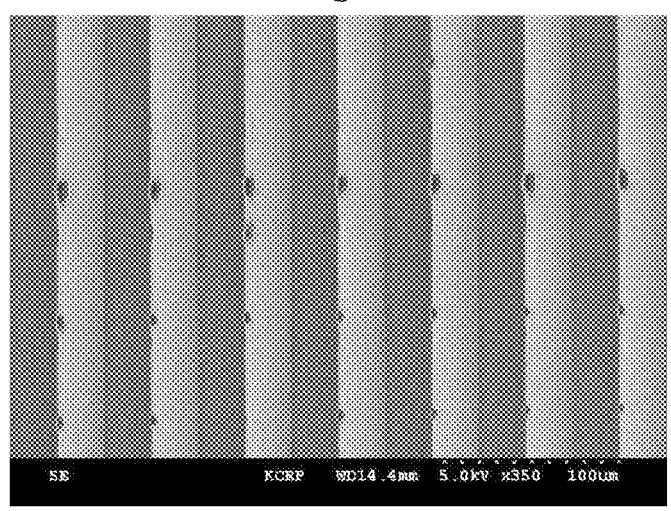
Figure 9:
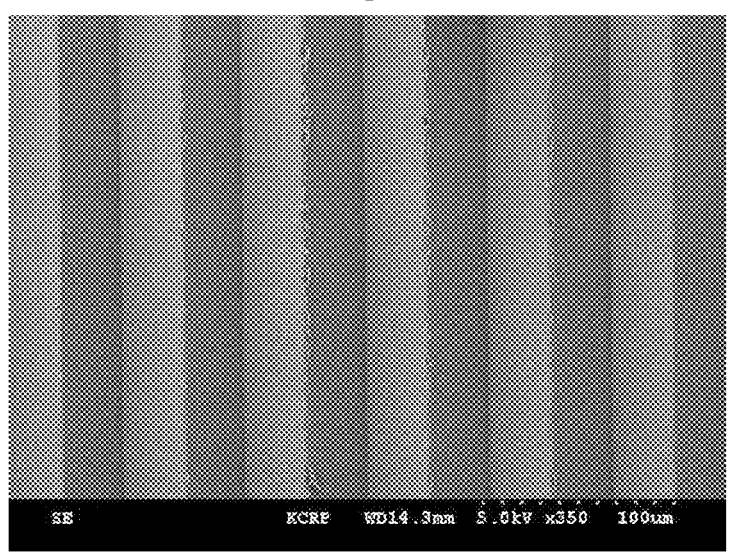

FIG. 4 schematically shows the process of scratching the optical sheet 50 of the present invention using a scratching probe 15, and FIG. 5 schematically shows the process of scratching a conventional optical sheet 30 using a scratching probe 15.

The upper portion of the structured layer 35 of a conventional optical sheet 30 is deformed or broken by the use of the scratching probe 15, resulting in severe damage.

In contrast, even when the optical sheet 50 of the present invention is scratched, almost no damage to the upper portion of the structured layer 55 thereof occurs.

In addition, the optical sheet according to the present invention may be an optical sheet consisting of a structured layer which is a resin-cured layer having a structured surface; a light diffusion layer formed on the structured layer to be in contact therewith; and a substrate layer. Such an optical sheet may overcome a conventional problem due to the combination of a plurality of optical sheets, and further, may increase luminance and may control the viewing of bright lines thanks to the structured surface.

A better understanding of the present invention may be obtained through the following examples, which are set forth to illustrate, but are not to be construed as the limit of the present invention.

Preparation of Urethane Acrylate Oligomer

Synthesis Example 1

In a 1000 ml four-neck flask equipped with an oil bath, a thermometer, a reflux condenser, and a dropping funnel, 0.195 mol ether-based polyol (PPG, Lupranol 1100, available from BASF), 0.243 mol 1,6-hexanediol, and 0.03 g of dibutyltin dilaurate as a reaction catalyst were placed, and were then mixed with stirring at about 70~80° C. for 30 min, after which 0.730 mol diphenylmethane diisocyanate was added in 2~3 separate steps at intervals of about 1 hour. Then, the reaction was allowed to occur for a total of about 5 hours, thus preparing a urethane prepolymer having an isocyanate end. The R(N=C=O/OH, the ratio of isocyanate group to hydroxyl group) of the prepolymer having an isocyanate end was about 1.66, and the ratio of HS (Hard Segment)/SS (Soft Segment) of the urethane prepolymer was about 1/1.32.

Thereafter, in order to prevent the thermal polymerization of vinyl group, the temperature of the reactor was decreased to about 50° C., and 0.657 mol hydroxyethylacrylate was added thereto, after which stirring was conducted for 4~6 hours until isocyanate groups were completely consumed. Using an FT-IR spectrum, isocyanate having an intrinsic peak of N=C=O near 2270 $cm^{-1}$ was confirmed to be absent, after which the reaction was terminated, thereby obtaining a urethane acrylate oligomer.

Synthesis Example 2

A urethane acrylate oligomer was prepared in the same manner as in SYNTHESIS EXAMPLE 1, with the exception that the ratio of polyol to chain extender to diphenylmethane diisocyanate was adjusted, thus obtaining a urethane prepolymer having a ratio of HS (Hard Segment)/SS (Soft Segment) of about 1/1.51.

Synthesis Example 3

A urethane acrylate oligomer was prepared in the same manner as in SYNTHESIS EXAMPLE 1, with the exception that the ratio of polyol to chain extender to diphenylmethane diisocyanate was adjusted, thus obtaining a urethane prepolymer having a ratio of HS (Hard Segment)/SS (Soft Segment) of about 1/2.65.

Synthesis Example 4

A urethane acrylate oligomer was prepared in the same manner as in SYNTHESIS EXAMPLE 1, with the exception that the ratio of polyol to chain extender to diphenylmethane diisocyanate was adjusted, thus obtaining a urethane prepolymer having a ratio of HS (Hard Segment)/SS (Soft Segment) of about 1/3.9.

Synthesis Example 5

In a 1000 ml four-neck flask equipped with an oil bath, a thermometer, a reflux condenser, and a dropping funnel, 0.164 mol ether-based polyol (PPG, Lupranol 1100, available from BASF), 0.135 mol 1,6-hexanediol, 0.14 mol 9,9-bis(4-hydroxyphenyl)fluorene, and 0.03 g of dibutyltin dilaurate as a reaction catalyst were placed, and were then mixed with stirring at about 70~80° C. for 30 min, after which 0.730 mol diphenylmethane diisocyanate was added in 2~3 separate steps at intervals of about 1 hour. Then, the reaction was allowed to occur for a total of about 5 hours, thus preparing a urethane prepolymer having an isocyanate end. The R(N=C=O/OH, the ratio of isocyanate group to hydroxyl group) of the prepolymer having an isocyanate end was about 1.65.

Thereafter, in order to prevent the thermal polymerization of the vinyl group, the temperature of the reactor was decreased to about 50° C., and 0.657 mol hydroxyethylacrylate was added thereto, after which stirring was conducted for 4~6 hours until isocyanate groups were completely consumed. Using an FT-IR spectrum, isocyanate having an intrinsic peak of N=C=O near 2270 $cm^{-1}$ was confirmed to be absent, after which the reaction was terminated, thereby obtaining a urethane acrylate oligomer.

Synthesis Example 6

A urethane acrylate oligomer was prepared in the same manner as in SYNTHESIS EXAMPLE 5, with the exception that 0.14 mol bisphenol A was used, instead of 9,9-bis(4-hydroxyphenyl)fluorene, thus obtaining a urethane prepolymer.

Synthesis Example 7

A urethane acrylate oligomer was prepared in the same manner as in SYNTHESIS EXAMPLE 5, with the exception that 0.14 mol bis(4-hydroxyphenyl)methane was used, instead of 9,9-bis(4-hydroxyphenyl)fluorene, thus obtaining a urethane prepolymer.

Synthesis Example 8

A urethane acrylate oligomer was prepared in the same manner as in SYNTHESIS EXAMPLE 5, with the exception that 0.14 mol 4,4'-thiodiphenol was used, instead of 9,9-bis (4-hydroxyphenyl)fluorene, thus obtaining a urethane prepolymer.

Synthesis Example 9

A urethane acrylate oligomer was prepared in the same manner as in SYNTHESIS EXAMPLE 5, with the exception that 0.14 mol 4,4'-dihydroxydiphenyl ether was used, instead of 9,9-bis(4-hydroxyphenyl)fluorene, thus obtaining a urethane prepolymer.

Synthesis Example 10

A urethane acrylate oligomer was prepared in the same manner as in SYNTHESIS EXAMPLE 5, with the exception that 0.14 mol 4,4'-dihydroxybiphenyl was used, instead of 9,9-bis(4-hydroxyphenyl)fluorene, thus obtaining a urethane prepolymer.

Manufacture of Optical Sheet

Example 1

Based on 100 parts by weight of a composition, 70 parts by weight of the urethane acrylate of Synthesis Example 1, 10 parts by weight of phenoxyethyl methacrylate (SR340, available from Sartomer), 15 parts by weight of phenoxyethyl acrylate (SR339, available from Sartomer), 1.5 parts by weight of 2,4,6-trimethylbenzoyldiphenylphosphine oxide as a photoinitiator, 1.5 parts by weight of methyl benzoylformate as a photoinitiator, and 2.0 parts by weight of bis(1,2,2,6,6-pentamethyl-4-piperidyl)sebacate as an additive were mixed at 60° C. for 1 hour, thus preparing a composition for a resin-cured layer. Thereafter, the composition thus obtained was applied on one surface of a polyethyleneterephthalate (PET) film (thickness: 188±2 μm, available from KOLON) as a substrate layer, the frame of a prism-shaped roller was covered therewith at 35° C., and then UV light was radiated onto the outer surface of the substrate layer at 900 mJ/cm² using a UV radiation system (600 W/inch, available from Fusion) provided with a Type-D bulb, thus forming linear triangular prisms having a vertex of 90°, a pitch of 50 μm, and a height of 27 μm (including the height of an anchor), thereby manufacturing an optical sheet (D=215 μm).

Example 2

An optical sheet was manufactured in the same manner as in Example 1, with the exception that lenticular lenses having a semicircular cross-section, a pitch of 50 μm, and a height of 27 μm were formed.

Example 3

An optical sheet was manufactured in the same manner as in Example 1, with the exception that columns having a semicircular cross-section, a pitch of 50 μm, and a height of 27 μm were arranged in a linear array.

Example 4

An optical sheet was manufactured in the same manner as in Example 1, with the exception that linear prisms having a pentagonal cross-section, a vertex of 95°, a pitch of 50 μm, and a height of 27 μm were formed.

Example 5

An optical sheet was manufactured in the same manner as in Example 1, with the exception that prisms having a semicircular cross-section, a pitch of 50 μm, and a height of 27 μm were arranged in a wave form.

Example 6

An optical sheet was manufactured in the same manner as in Example 1, with the exception that the urethane acrylate of SYNTHESIS EXAMPLE 2 was used.

Example 7

An optical sheet was manufactured in the same manner as in Example 1, with the exception that the urethane acrylate of SYNTHESIS EXAMPLE 3 was used.

Example 8

An optical sheet was manufactured in the same manner as in Example 1, with the exception that the urethane acrylate of SYNTHESIS EXAMPLE 4 was used.

Example 9

An optical sheet was manufactured in the same manner as in Example 1, with the exception that the urethane acrylate of SYNTHESIS EXAMPLE 5 was used.

Example 10

An optical sheet was manufactured in the same manner as in Example 9, with the exception that lenticular lenses having a semicircular cross-section, a pitch of 50 μm, and a height of 27 μm, were arranged in a linear array.

Example 11

An optical sheet was manufactured in the same manner as in Example 9, with the exception that columns having a semicircular cross-section, a pitch of 50 μm, and a height of 27 μm were arranged in a linear array.

Example 12

An optical sheet was manufactured in the same manner as in Example 9, with the exception that prisms having a pentagonal cross-section, a vertex of 95°, a pitch of 50 μm, and a height of 27 μm were arranged in a linear array.

Example 13

An optical sheet was manufactured in the same manner as in Example 9, with the exception that prisms having a semicircular cross-section, a pitch of 50 μm, and a height of 27 μm were arranged in a nonlinear array.

Example 14

An optical sheet was manufactured in the same manner as in Example 1, with the exception that the urethane acrylate of SYNTHESIS EXAMPLE 6 was used.

Example 15

An optical sheet was manufactured in the same manner as in Example 1, with the exception that the urethane acrylate of SYNTHESIS EXAMPLE 7 was used.

Example 16

An optical sheet was manufactured in the same manner as in Example 1, with the exception that the urethane acrylate of SYNTHESIS EXAMPLE 8 was used.

Example 17

An optical sheet was manufactured in the same manner as in Example 1, with the exception that the urethane acrylate of SYNTHESIS EXAMPLE 9 was used.

Example 18

An optical sheet was manufactured in the same manner as in Example 1, with the exception that the urethane acrylate of SYNTHESIS EXAMPLE 10 was used.

Example 19

An optical sheet (D=152 μm) was manufactured in the same manner as in Example 1, with the exception that the urethane acrylate of SYNTHESIS EXAMPLE 5 was used, and a PET film (thickness: 125 μm, available from KOLON) was used as the substrate layer.

Example 20

An optical sheet (D=277 μm) was manufactured in the same manner as in Example 1, with the exception that the urethane acrylate of SYNTHESIS EXAMPLE 5 was used, and a PET film (thickness: 250 μm, available from KOLON) was used as the substrate layer.

Comparative Example 1

As an optical sheet, a BEF3T prism film, available from 3M, was used. (D=215 μm)

Comparative Example 2

As an optical sheet, a Brite-200 prism film, available from DooSan, was used. (D=215 μm)

Comparative Example 3

As an optical sheet, a LES-T2 prism film, available from LG, was used. (D=220 μm)

The refractive index of the structured layer using the composition for a structured layer of each of the examples and comparative examples was measured through the following method, and further, the optical sheet was measured for $D_1$, elastic recovery rate, scratch resistance and luminance as follows. The results are shown in Table 1 below.

(1) Refractive Index of Structured Layer

In order to evaluate the refractive index of the structured layer, the composition for a structured layer was applied on a PET film (thickness: 188 μm), a metal plate having a smooth surface was placed thereon, and then pressure was applied thereto such that the total thickness was 20 μm. Thereafter, using an electrodeless UV radiation system (600 W/inch, available from Fusion) provided with a Type-D bulb, energy of 700 mJ/cm$^3$ was radiated onto the outer surface of the PET film, and then the metal plate was separated. The refractive index of the composition cured on the PET film was measured using a refractometer (model number: IT, available from ATAGO ABBE, Japan). The light source for measurement was a sodium D-line lamp at 589.3 nm.

(2) $D_1$ and Elastic Recovery Rate

The $D_1$, $D_2$, and elastic recovery rate of the optical sheet of each of the examples and comparative examples were measured through a load-unload test using an ultra-micro hardness tester (DUH-W201S, available from Shimadzu, Japan). The mountain-shaped peak of the structured layer of the optical sheet was positioned at the center of a flat indenter having a diameter of 50 μm, after which $D_1$, $D_2$ and the elastic recovery rate were measured five times under the following conditions, and were then averaged. The results are shown in Table 1 below.

[1$^{st}$ Measurement Conditions]
a. Maximum Pressure: 1 g$_f$ (=9.807 mN)
b. Pressure per Unit Time: 0.2031 mN/sec
c. Holding Time at Maximum Pressure: 5 sec

[2$^{nd}$ Measurement Conditions]
a. Maximum Pressure: 2 g$_f$ (=19.614 mN)
b. Pressure per Unit Time: 0.2031 mN/sec
c. Holding Time at Maximum Pressure: 5 sec (3) Scratch Resistance Minimum pressure was applied to the optical sheet of each of the examples and comparative examples using a standard weight of a Big Heart tester, available from IMOTO, after which whether the structured layer was scratched was observed. The results are shown in Table 1 below. The degree of damage was observed with the naked eye and was then evaluated according to the following:

Poor scratch resistance ←x<Δ<○<⊚→ good scratch resistance (4) Luminance

Two optical sheets of each of the above examples and comparative examples were mounted perpendicular to each other to a backlight unit (model number: LM170E01, available from Heesung Electronics, Korea) for 17" LCD panels, and the luminance values of 13 random points were measured using a luminance meter (model number: BM-7, available from TOPCON, Japan), and then averaged.

TABLE 1

| Ex. No. | Refra. Index of Structured Layer | D (μm) | 1$^{st}$ Conditions ||| 2$^{nd}$ Conditions ||| Scratch Resist. | Luminance (cd/m$^2$) |
| | | | $D_1$ (μm) | $D_2$ (μm) | Elastic Recovery (%) | $D_1$ (μm) | $D_2$ (μm) | Elastic Recovery (%) | | |
|---|---|---|---|---|---|---|---|---|---|---|
| 1 | 1.56 | 215 | 11.227 | 0.696 | 93.8 | 13.679 | 1.080 | 92.1 | ⊚ | 2437 |
| 2 | 1.56 | 215 | 10.213 | 0.806 | 92.1 | 12.440 | 0.933 | 92.5 | ⊚ | 2120 |
| 3 | 1.56 | 215 | 11.012 | 1.024 | 90.7 | 13.413 | 1.180 | 91.2 | ⊚ | 2256 |
| 4 | 1.56 | 215 | 12.019 | 1.033 | 91.4 | 14.243 | 1.310 | 90.8 | ⊚ | 2419 |
| 5 | 1.56 | 215 | 11.201 | 1.064 | 90.5 | 13.446 | 1.196 | 91.1 | ⊚ | 2271 |
| 6 | 1.55 | 215 | 12.605 | 1.361 | 89.2 | 15.458 | 1.131 | 88.4 | ○ | 2413 |
| 7 | 1.54 | 215 | 13.105 | 1.638 | 87.5 | 16.268 | 2.228 | 86.3 | ○ | 2389 |
| 8 | 1.53 | 215 | 14.201 | 1.959 | 86.2 | 17.185 | 2.388 | 86.1 | Δ | 2343 |
| 9 | 1.57 | 215 | 11.359 | 1.499 | 86.8 | 12.854 | 1.709 | 86.7 | ⊚ | 2473 |
| 10 | 1.57 | 215 | 11.348 | 1.418 | 87.5 | 12.796 | 1.625 | 87.3 | ⊚ | 1986 |
| 11 | 1.57 | 215 | 11.352 | 1.464 | 87.1 | 12.801 | 1.676 | 86.9 | ⊚ | 2228 |
| 12 | 1.57 | 215 | 11.358 | 1.487 | 86.9 | 12.823 | 1.705 | 86.7 | ⊚ | 2464 |
| 13 | 1.57 | 215 | 11.354 | 1.453 | 87.2 | 12.811 | 1.742 | 86.4 | ⊚ | 2230 |
| 14 | 1.56 | 215 | 11.525 | 1.475 | 87.2 | 13.221 | 1.731 | 86.9 | ⊚ | 2458 |
| 15 | 1.56 | 215 | 11.511 | 1.484 | 87.1 | 13.118 | 1.784 | 86.4 | ⊚ | 2460 |
| 16 | 1.57 | 215 | 11.361 | 1.488 | 86.9 | 12.921 | 1.692 | 86.9 | ⊚ | 2469 |
| 17 | 1.56 | 215 | 11.541 | 1.465 | 87.3 | 13.136 | 1.707 | 87.0 | ⊚ | 2461 |
| 18 | 1.56 | 215 | 11.343 | 1.440 | 87.3 | 13.112 | 1.757 | 86.6 | ⊚ | 2463 |
| 19 | 1.57 | 152 | 11.359 | 1.499 | 86.8 | 12.854 | 1.709 | 86.7 | ⊚ | 2485 |
| 20 | 1.57 | 277 | 11.359 | 1.499 | 86.8 | 12.854 | 1.709 | 86.7 | ⊚ | 2462 |
| C.1 | 1.59 | 215 | 2.862 | 0.689 | 75.9 | 3.772 | 0.890 | 76.4 | X | 2494 |
| C.2 | 1.58 | 215 | 4.846 | 0.785 | 83.8 | 5.460 | 0.939 | 82.8 | Δ | 2476 |
| C.3 | 1.57 | 220 | 4.392 | 1.155 | 73.7 | 5.119 | 1.310 | 74.4 | X | 2466 |

As is apparent from Table 1, the structured layer of the optical sheets of the examples of the present invention, having an elastic recovery rate of 85% or more, exhibited excellent scratch resistance. From this, it can be seen that the optical sheet of the present invention can be greatly pressed without damage to the structures under external impact and is then returned as close as possible to its original state, thus flexibly accommodating external impact and preventing damage thereto.

Example 21

100 parts by weight of 9,9-bis[4-(2-acryloyloxyethoxy)phenyl]fluorene, 20 parts by weight of tris(2-hydroxyethyl)isocyanurate triacrylate, 3 parts by weight of 1,6-hexanedioldiacrylate, 63 parts by weight of phenoxyethyl acrylate, 6 parts by weight of 2,4,6-trimethylbenzoyldiphenylphosphine oxide, 3.6 parts by weight of 2 (2-hydroxy-5-t-octoxybenzotriazole), and 3 parts by weight of bis(1,2,2,6,6-pentamethyl-4-piperidyl)sebacate were mixed, thus preparing a composition for a resin-cured layer.

The composition for a resin-cured layer was placed along with a PET film having a thickness of 188±2 μm in a cylindrical mold (engraved with a linear array of triangular prisms having an isosceles triangular cross-section with a vertex of 90°, a base of 50 μm, and a height of 25 μm), after which UV light of 100 mJ/m$^2$ (600 W/inch, D bulb, available from Fusion) was radiated thereon, thus primarily curing the optical sheet. Then, UV light of 500 mJ/m$^2$ (600 W/inch, D bulb, available from Fusion) was radiated onto the primarily cured optical sheet, thus secondarily curing the optical sheet, which was then separated from the mold, thereby obtaining the optical sheet of the present invention.

Example 22

39 parts by weight of epoxy acrylate (CN120, available from Sartomer), 39 parts by weight of ethoxylated bisphenol A diacrylate (SR-349, available from Sartomer), 7.5 parts by weight of 1,6-hexanedioldiacrylate (SR-238, available from Sartomer), 11.5 parts by weight of tris(2-hydroxyethyl)isocyanurate triacrylate (SR-368, available from Sartomer), and 3 parts by weight of 2,4,6-trimethylbenzoyldiphenylphosphine oxide (Darocure TPO, available from CIBA) as a photoinitiator were mixed, thus preparing a composition for a resin-cured layer.

The composition for a resin-cured layer was placed along with a PET film having a thickness of 188±2 μm in a cylindrical mold (engraved with a linear array of triangular prisms having an isosceles triangular cross-section with a vertex of 90°, a base of 50 μm, and a height of 25 μm), after which UV light of 150 mJ/m$^2$ (600 W/inch, D bulb, available from Fusion) was radiated thereon, thus primarily curing the optical sheet. Thereafter, UV light of 600 mJ/m$^2$ (600 W/inch, D bulb, available from Fusion) was radiated onto the primarily cured optical sheet, thus secondarily curing the optical sheet, which was then separated from the mold, thereby obtaining the optical sheet of the present invention.

Example 23

The same composition for a resin-cured layer as in Example 21 was prepared.

The composition for a resin-cured layer was placed along with a PET film having a thickness of 188±2 μm in a cylindrical mold (engraved with a linear array of columns having a semicircular cross-section in a diameter of 50 μm), after which UV light of 100 mJ/m$^2$ (600 W/inch, D bulb, available from Fusion) was radiated thereon, thus primarily curing the optical sheet. Then, UV light of 500 mJ/m$^2$ (600 W/inch, D bulb, available from Fusion) was radiated onto the primarily cured optical sheet, thus secondarily curing the optical sheet, which was then separated from the mold, thereby obtaining the optical sheet of the present invention.

Example 24

The same composition for a resin-cured layer as in Example 22 was prepared.

The composition for a resin-cured layer was placed along with a PET film having a thickness of 188±2 μm in a cylindrical mold (engraved with a linear array of columns having a semicircular cross-section in a diameter of 60 μm), after which UV light of 150 mJ/m$^2$ (600 W/inch, D bulb, available from Fusion) was radiated thereon, thus primarily curing the optical sheet. Then UV light of 600 mJ/m$^2$ (600 W/inch, D bulb, available from Fusion) was radiated onto the primarily cured optical sheet, thus secondarily curing the optical sheet, which was then separated from the mold, thereby obtaining the optical sheet of the present invention.

The optical sheets of Examples 21 to 24 and commercially available optical sheets, as shown in Table 2 below, were subjected to a load-unload test using an ultra-micro hardness tester (DUH-W201S, available from Shimadzu, Japan) and evaluated as follows. The results are shown in Table 2, below.

The peak of one structure of the structured surface of the optical sheet was positioned at the center of a flat circular indenter having a diameter of 50 μm, after which the pressed depth $D_1$ when pressure was applied under the following conditions was measured.

[Measurement Conditions]
a. Maximum Pressure: 5 g$_f$ (=49.033 mN)
b. Loading Rate up to Maximum Pressure: 2.6478 mN/sec
c. Holding Time at Maximum Pressure: 5 sec Thereafter, the height of the sheet after pressure was removed therefrom was measured, and the difference $D_2$ from the original height of the optical sheet was calculated.

The tests were conducted in a manner such that three sheets were prepared for each of the above examples and comparative examples, and each of the three sheets was subjected to pressing three times, after which the tested values were averaged. The results are shown in Table 2 below.

TABLE 2

| | 1$^{st}$ Sheet | | 2$^{nd}$ Sheet | | 3$^{rd}$ Sheet | |
|---|---|---|---|---|---|---|
| | $D_2$ (μm) | $D_1$ (μm) | $D_2$ (μm) | $D_1$ (μm) | $D_2$ (μm) | $D_1$ (μm) |
| Ex. 21 | 1.493 | 13.277 | 1.477 | 13.042 | 1.538 | 12.555 |
| Ex. 22 | 1.695 | 12.122 | 1.661 | 14.657 | 1.743 | 14.003 |
| Ex. 23 | 1.561 | 11.958 | 1.498 | 12.225 | 1.536 | 11.651 |
| Ex. 24 | 1.622 | 13.202 | 1.742 | 12.525 | 1.693 | 11.799 |
| C. Ex. 1 | 2.442 | 12.803 | 2.325 | 10.674 | 2.301 | 15.594 |
| C. Ex. 2 | 2.132 | 13.122 | 2.001 | 12.227 | 2.008 | 10.905 |
| C. Ex. 3 | 2.216 | 10.070 | 2.223 | 11.809 | 2.344 | 12.230 |

Note:
C. Ex. 1: BEF3T, available from 3M
C. Ex. 2: Brite-200, available from DooSan
C. Ex. 3: LES-T2, available from LG Further, in the optical sheets having the surface properties in response to the load-unload test as is apparent from Table 2, the structured surface was subjected to a scratching test through the process shown in FIG. 4. Then, using an FE-SEM (model number: S-4300, available from HITACHI, Japan), whether the structured surface was scratched was evaluated (criteria: poor scratch resistance ←×<Δ<○<◎→ good scratch resistance). The results are shown in Table 3 below. FIG. 4 schematically shows the process of scratching the optical sheet 50 using a scratching probe 15.

The SEM images of the optical sheets of Example 21 and Comparative Examples 1 to 3 are shown in FIGS. 6 to 9, respectively.

Further, through the elemental analysis of the structured layer of the optical sheet, whether the element having 7 valence electrons was detected was evaluated. The results are also shown in Table 3 below.

The elemental analysis was conducted using ion chromatography.

TABLE 3

|  | Ex. | | | | C. Ex. | | |
| --- | --- | --- | --- | --- | --- | --- | --- |
|  | 21 | 22 | 23 | 24 | 1 | 2 | 3 |
| Scratch Resistance | ◎ | ◎ | ◎ | ◎ | X | X | X |
| Detection of Element having 7 valence electrons | No | No | No | No | Yes | Yes | Yes |

As is apparent from Table 3, the optical sheet of the present invention, having small changes in the height thereof upon loading and unloading to prevent destruction or breakdown due to pressing, was seen to be insignificantly damaged upon scratching. This can be more definitely confirmed from the SEM images of FIGS. 6 to 9.

Moreover, the optical sheet of the present invention has a structured layer without an element having 7 valence electrons, thus being environmentally friendly.

What is claimed is:

1. An optical sheet, comprising
   a structured layer, which is a resin-cured layer having a structured surface; and
   a substrate layer formed to be in contact with the structured layer,
   wherein, when the structured surface is loaded up to a maximum pressure of 5 $g_f$ at a loading rate of 2.648 mN/sec using a flat indenter, in which a shape of a surface of the indenter coming into contact with the structured surface is circular and which has a diameter of 50 μm, held at the maximum pressure for 5 sec, and then unloaded, a difference ($D_2$) between a height of the sheet after being unloaded and an original height of the sheet before being loaded satisfies Expression 1 below:

$$D_2 < D/120 \quad \text{Expression 1}$$

wherein D is the height of the optical sheet before being loaded; and
   wherein said substrate layer has a thickness of 188 μm±2 μm.

2. The optical sheet according to claim 1, wherein, when the structured surface is loaded up to a maximum pressure of 5 $g_f$ at a loading rate of 2.648 mN/sec using a flat indenter and is then held at the maximum pressure for 5 sec, a pressed depth ($D_1$) satisfies Expression 2 below:

$$D_1 < D/15. \quad \text{Expression 2}$$

3. The optical sheet according to claim 2, wherein the $D_1$ is less than D/16.

4. The optical sheet according to claim 1, wherein the structured layer has a refractive index of 1.5 or more.

5. The optical sheet according to claim 1, wherein the resin-cured layer is formed from a photopolymerizable composition comprising a photocurable acrylate monomer; a photoinitiator; and an additive.

6. The optical sheet according to claim 5, wherein the photocurable acrylate monomer is one or more selected from the group consisting of a fluorene derivative diacrylate monomer, a bisphenol derivative diacrylate monomer, and a diacrylate monomer having a thiol group.

7. The optical sheet according to claim 4, wherein the structured layer is configured in a form selected from the group consisting of a linear array of polyhedrons having a triangular, polygonal, semicircular or semi-elliptical cross-section, a linear array of columns which have a triangular, polygonal, semicircular or semi-elliptical cross-section and are adjacent to each other, a curved array of columns having a triangular, polygonal, semicircular or semi-elliptical cross-section, and combinations thereof.

8. The optical sheet according to claim 7, wherein the structured layer is configured in a form in which columns having a triangular cross-section are linearly arranged.

9. The optical sheet according to claim 8, wherein the triangular cross-section is an isosceles triangle having a base of 50 μm and a height of 25 μm.

10. The optical sheet according to claim 1, wherein no element having 7 valence electrons is contained in the structured layer.

11. An optical sheet, comprising a structured layer, which is a resin-cured layer having a structured surface,
    wherein, when the structured surface is loaded up to a maximum pressure of 1 $g_f$ or 2 $g_f$ at a loading rate of 0.2031 mN/sec using a flat indenter, held at the maximum pressure for 5 sec, and then unloaded, the optical sheet has an elastic recovery rate, represented by Expression 3, below, of 90% or more:

$$\text{Elastic Recovery Rate} = \frac{D_1 - D_2}{D_1} \times 100 \quad \text{Expression 3}$$

wherein $D_1$ is a pressed depth due to external pressure, and $D_2$ is a difference between a height of the optical sheet before external pressure is applied and a height of the optical sheet returned to an original state after external pressure is removed; and
   wherein the $D_1$ satisfies Expression 4 below:

$$D_1 > \frac{D}{25} \quad \text{Expression 4}$$

wherein D indicates the height of the optical sheet before external pressure is applied.

12. The optical sheet according to claim 11, wherein the $D_1$ satisfies Expression 5 below:

$$D_1 > \frac{D}{20} \quad \text{Expression 5}$$

wherein D indicates the height of the optical sheet before external pressure is applied.

13. The optical sheet according to claim 12, wherein the $D_1$ satisfies Expression 6 below:

$$D_1 > \frac{D}{19} \quad \text{Expression 6}$$

wherein D indicates the height of the optical sheet before external pressure is applied.

14. The optical sheet according to claim 13, wherein the $D_1$ satisfies Expression 7 below:

$$D_1 > \frac{D}{17} \quad \text{Expression 7}$$

wherein D indicates the height of the optical sheet before external pressure is applied.

15. The optical sheet according to claim 14, wherein the $D_1$ satisfies Expression 8 below:

$$D_1 > \frac{D}{14} \quad \text{Expression 8}$$

wherein D indicates the height of the optical sheet before external pressure is applied.

16. The optical sheet according to claim 11, wherein the resin-cured layer has a refractive index of 1.5 or more.

17. The optical sheet according to claim 11, wherein the resin-cured layer comprises one or more curable materials selected from a group consisting of urethane acrylate, a styrene monomer, a butadiene monomer, an isoprene monomer, and silicone acrylate.

18. The optical sheet according to claim 11, wherein the structured layer is configured in a form of a linear array of polyhedrons having a triangular, polygonal, semicircular or semi-elliptical cross-section, a linear array of columns which have a triangular, polygonal, semicircular or semi-elliptical cross-section and are adjacent to each other, or a curved array of columns having a triangular, polygonal, semicircular or semi-elliptical cross-section.

19. A backlight unit assembly, comprising the optical sheet of claim 1, arranged in one or more layers.

20. A backlight unit assembly, comprising the optical sheet of claim 11, arranged in one or more layers.

\* \* \* \* \*